United States Patent [19]

Gergen et al.

[11] Patent Number: 5,001,665
[45] Date of Patent: Mar. 19, 1991

[54] ADDRESSING TECHNIQUE FOR PROVIDING READ, MODIFY AND WRITE OPERATIONS IN A SINGLE DATA PROCESSING CYCLE WITH SERPENTINE CONFIGURED RAMS

[75] Inventors: Joseph P. Gergen; Charles D. Thompson, both of Austin, Tex.

[73] Assignee: Motorola, Inc., Schaumburg, Ill.

[21] Appl. No.: 878,926

[22] Filed: Jun. 26, 1986

[51] Int. Cl.⁵ .............................................. G06F 13/00
[52] U.S. Cl. ..................................................... 364/900
[58] Field of Search ... 364/200 MS File, 900 MS File; 365/189, 233, 239

[56] References Cited

U.S. PATENT DOCUMENTS

| | | | |
|---|---|---|---|
| 3,875,391 | 4/1975 | Shapiro et al. | 364/200 X |
| 4,169,284 | 9/1979 | Hogan et al. | 364/200 |
| 4,217,639 | 8/1980 | Hartley et al. | 364/200 |
| 4,245,304 | 1/1981 | Porter et al. | 364/200 |
| 4,303,988 | 12/1981 | Tsuboka et al. | 364/900 |
| 4,317,168 | 2/1982 | Messina et al. | 364/200 |
| 4,382,279 | 5/1983 | Ugon | 364/200 |
| 4,639,866 | 1/1987 | Loo | 364/200 |
| 4,724,518 | 2/1988 | Steps | 364/200 |

OTHER PUBLICATIONS

Driscoll et al., Split Cache with Variable Interleave Boundry, 4/80, IBM Technical Disclosure Bulletin, vol. 22, #11, p. 5183.

Primary Examiner—Gary V. Harkcom
Assistant Examiner—Mark K. Zimmerman
Attorney, Agent, or Firm—Robert L. King

[57] ABSTRACT

A technique for accomplishing a read, modify and write operation of a memory in a processor in a single cycle of the processor, where a cycle is understood as the time between successive loads of operands to the processor. A memory having two distinct portions of operands is provided wherein the single cycle operations are accomplished by virtually addressing the operands in a serpentine or snake-like configuration. A decoder is provided for efficiently controlling the concurrent reading and writing of operands and controlling the addressing of the memory.

5 Claims, 2 Drawing Sheets

| | | | | | | | |
|---|---|---|---|---|---|---|---|
| WRITE CYCLE | | | 0 | 1 | 2 | 3 | 4 |
| MODIFY CYCLE | | 0 | 1 | 2 | 3 | 4 | 5 |
| READ CYCLE | 0 | 1 | 2 | 3 | 4 | 5 | 6 |
| CYCLE # | 1 | 2 | 3 | 4 | 5 | 6 | 7 |

ADDRESSING TECHNIQUE FOR PROVIDING READ, MODIFY AND WRITE OPERATIONS IN A SINGLE DATA PROCESSING CYCLE WITH SERPENTINE CONFIGURED RAMS

TECHNICAL FIELD

This invention relates generally to memory addressing, and more particularly, to processors using memory to read, modify and write operands.

BACKGROUND ART

As digital processors advance in complexity, the use of limited internal memory is becoming increasingly popular as opposed to always having to communicate with memory external to the processor. In digital filtering, a need often exists to read an operand from memory, perform an operation on the operand and then write the modified operand back to memory. Such an operation is very common in adaptive filters. With pipelined processor architectures, it is possible to execute many operations during a single processor machine cycle, where a cycle is typically defined as the time between successive inputting of data to an arithmetic unit (AU). Therefore, in order to read a first operand from memory, modify a second operand in an AU, and write a third operand back to the memory in a pipelined architecture, at least two processor cycles are required. Two cycles are required in order to avoid a data collision in reading and writing data to the memory at the same time. Such systems which accomplish read, modify and write operations in a memory typically utilize virtual dual-port RAMs requiring processor wait states and port arbitration.

BRIEF DESCRIPTION OF THE INVENTION

Accordingly, an object of the present invention is to provide an improved addressing technique for providing read, modify and write operations in a memory.

Another object of the present invention is to provide an improved RAM structure having serpentine addressing for accomplishing read and write cycles of the RAM.

Yet another object of the present invention is to provide an improved processor with memory having a pipelined architecture for executing read, modify and write operations in a single cycle.

In carrying out the above and other objects of the present invention, there is provided, in one form, a circuit which addresses a memory in a manner which permits read and write operations with the memory. The memory is partitioned into first and second portions which can be communicated with an arithmetic unit via first and second bidirectional data buses. Each of the memory portions has a predetermined integer number of rank ordered physical and virtual address locations. The physical address locations of each memory portion are positioned in a sequential order and correlated with each memory portion. The rank ordered virtual address locations of the memory are positioned in a serpentine pattern between the two memory portions. A first virtual address location of lowest rank is positioned in the lowest ranked physical address location of the first memory portion. Remaining virtual address locations are successively positioned in rank ordered pairs in successive physical address locations of alternating memory portions. A decoder may simultaneously address two odd integer numbered or two even integer numbered virtual address locations thereby reading one of the portions of memory while writing the other portion of memory during the same processing cycle.

These and other objects, features and advantages will be more clearly understood from the following detailed description taken in conjunction with the accompanying drawings.

DETAILED DESCRIPTION OF THE INVENTION

Figure 1:
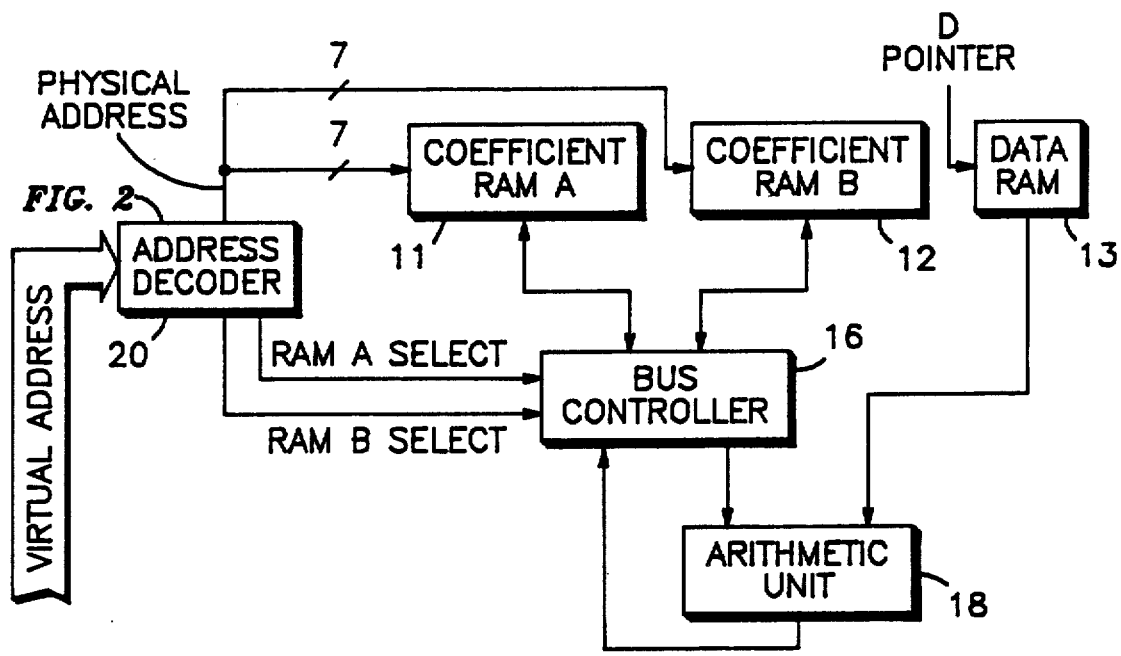
FIG. 1 illustrates in block diagram form a processor utilizing the addressing technique of the present invention.

Shown in FIG. 1 is a processor 10 for implementing an adaptive filter operation. Processor 10 generally comprises a random access memory (RAM) 11 labeled "Coefficient RAM A", a random access memory 12 labeled "Coefficient RAM B", a data RAM 13, a bus controller 16, an arithmetic unit 18 and an address decoder 20. Address decoder 20 has an input for receiving a virtual address and has an output connected to an address input of both RAM 11 and RAM 12. Second and third outputs of address decoder 20 are connected to first and second control inputs of bus controller 16. An input/output of RAM 11 is connected to a first input/ output of bus controller 16, and an input/output of RAM 12 is connected to a second input/output of bus controller 16. An output of bus controller 16 is connected to a first input of arithmetic unit 18. Data RAM 13 receives a data address labeled "D pointer" which points to a data operand connected to a control input and has an output connected to a second input of arithmetic unit 18. An output of arithmetic unit 18 is connected to a third input of bus controller 16.

In operation, processor 10 functions to selectively provide predetermined coefficient operands and stored data operands to arithmetic unit 18 for processing. A typical processing operation utilizing this structure is an adaptive filter operation. Adaptive filters are a unique class of filters which basically provide an output which represents a difference or error between a desired signal and an estimate of the desired signal. A common adaptive filter structure is based on a finite impulse response (FIR) filter structure. FIR filtering is based upon a conventional filtering equation which is an accumulation of products of predetermined coefficients representing the impulse response of the filter and a digitized input data waveform. The adaptive filter adapts the coefficients of the FIR filter using the conventional Least-Mean-Square (LMS) algorithm. An updated coefficient value is proportional to the sum of a previous coefficient value and a scaled product of the calculated error multiplied by its associated data sample. After several iterations of data sample periods, the FIR filter coefficients converge to values which consistently minimize the mean square error which is the filter's output. Therefore, the coefficient values which are stored in memory are constantly being read, modified and written back to the memory.

Processor 10 implements such an adaptive filtering operation by selectively communicating a predetermined coefficient operand from one of RAMs 11 and 12 and communicating a data operand from data RAM 13 to arithmetic unit 18 which implements the LMS algorithm. The "D" data address pointer controlling data RAM 13 is provided by a conventional microcontroller which is not shown. Bus controller 16 controls whether a coefficient from RAM 11 or RAM 12 is communicated to arithmetic unit 18. Arithmetic unit 18 provides an updated coefficient value which may be written back to either RAM 11 or RAM 12 via bus controller 16 which must avoid operand collisions on the bidirectional buses between controller 16 and RAMs 11 and 12. RAMs 11 and 12 should actually be considered as first and second portions of a single memory. It should be apparent that the present invention may be implemented either with a single memory having two segregated portions of memory or as two distinct memory devices. For purposes of illustration only, the memory is illustrated as two distinct circuits in the form of RAMs 11 and 12.

During a single data processing cycle, a coefficient may be read from one of the memory portions comprising RAMs 11 and 12 while an updated coefficient is also being written to the other of RAMs 11 and 12. In the simultaneous cycle, arithmetic unit 18 may be modifying a previously fetched coefficient from memory. In this context, a single data processing cycle is defined as the time between successive loadings of operands to arithmetic unit 18. By virtue of the pipelined architecture of processor 10, the three operations just described (i.e. read, modify, write) may be processed in the same cycle and the operation is a three level or three stack pipelined operation.

Figure 2:
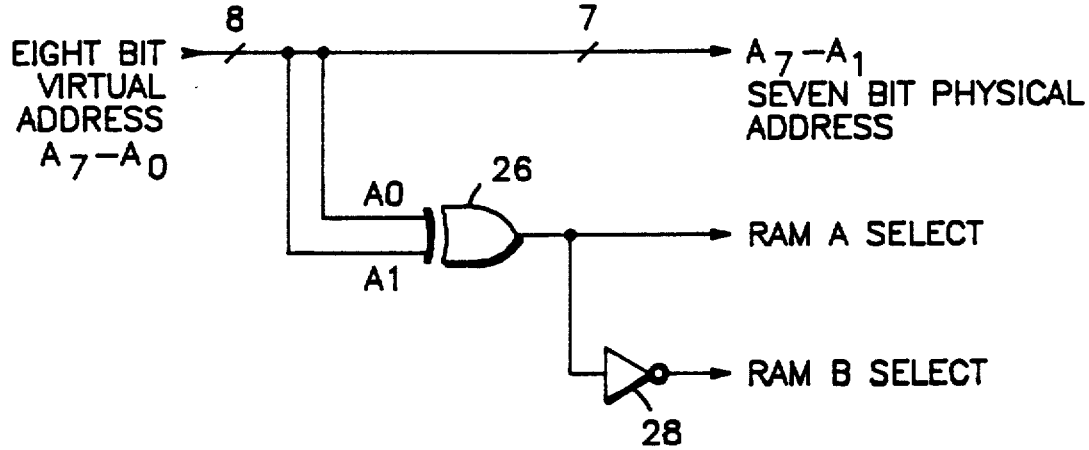
FIG. 2 illustrates in schematic form an address decoder used to implement the present invention in the processor of FIG. 1.

Inherent in the present invention's ability to read and write a memory while modifying a previously read operand is the ability to address the memory in a manner which permits simultaneous cycle reading and writing without operand collisions. Shown in FIG. 2 is address decoder 20 of FIG. 1. An exclusive OR gate 26 has first and second inputs each for receiving a bit of an eight bit virtual address word illustrated by bits $A_0$ thru $A_7$ from least significant to most significant. Bits $A_1$ thru $A_7$ are each communicated to the inputs of RAMs 11 and 12 and represent a physical address location in RAMs 11 and 12. Only the least significant bit $A_0$ and next to least significant bit $A_1$ are communicated to the inputs of exclusive OR gate 26. An output of exclusive OR gate 26 provides a select control signal for RAM 11 labeled "RAM A Select" which is coupled to bus controller 16. An input of an inverter 28 is connected to the output of exclusive OR gate 26. An output of inverter 28 provides a select control signal for RAM 12 labeled "RAM B Select".

The operation of decoder 20 may be more readily understood when discussed in connection with the physical layout of RAMs A and B illustrated in FIG. 3. RAM A or RAM 11 is illustrated with horizontal rank ordered address locations and above RAM B or RAM 12. Each RAM is illustrated as having a rank ordered physical address beginning with physical address zero and continuing sequentially to the right. Further, inside RAMs A and B are located rank ordered virtual address locations which are oriented in a predetermined manner beginning with zero. As shown, RAM A (RAM 11) begins with virtual address zero and is adjacent to virtual address three. Continuing to the right are virtual addresses four, seven, eight and so forth. RAM B (RAM 12) begins with virtual address one which is adjacent virtual address two. Continuing to the right in RAM B are virtual addresses five, six, nine and so forth. Upon closer review it can be seen that a sequential order of the virtual addresses is positioned in the memory in a snake-like or serpentine fashion as shown by the curved line. The order of location of the virtual addresses is to initially alternate to the opposite memory (or memory portion) after the first virtual address and to locate two consecutive virtual memory addresses adjacent each other. The next virtual memory address is positioned by jumping to the opposite memory where two more consecutive virtual memory addresses are located. This order of virtual memory addresses is maintained until all virtual memory addresses are assigned. As a result of sequentially following the virtual addresses through the two segregated portions of memory, a serpentine pattern results. An example of the operation of processor 10 with the inventive memory addressing technique will be shown to illustrate how a read, modify, write operation of operands in the memory may be effected in a single cycle of the processor.

Figures 3, 4:
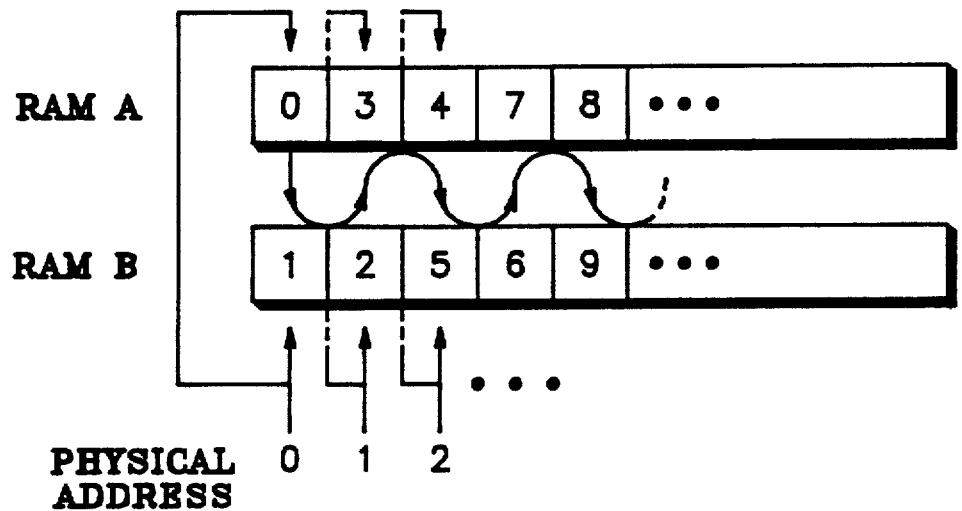
FIG. 3 illustrates in block diagram form the physical layout of the coefficient RAM portions of the processor of FIG. 1.
FIG. 4 illustrates in block diagram form an example of read, modify and write operations during consecutive cycles of the processor of FIG. 1.

Shown in FIG. 4 is a chart showing the operation of processor 10 on a cycle by cycle basis. Initially a read of logical address "0" occurs in the first cycle of operation. In the second cycle, the contents of logical address "0" are modified and the contents of logical address "1" are read. In the third cycle, logical address "0" is written with an operand resulting from the modify operation of cycle two, the contents of logical address "1" are modified and the contents of logical address "2" are read. A discussion of the fifth cycle of operation will illustrate how the memory may be both read and written to in the same cycle without incurring a collision of data. In the fifth cycle, virtual address four is being read and virtual address two is being written. The eight LSBs of the binary number representing virtual address "four" which is coupled to the input of address decoder 20 is 00000100. The output of exclusive OR gate 26 is a logic zero since both inputs are logic zero. Therefore, RAM A or RAM 11 is selected to read virtual address "four" therefrom. Now that bus controller 16 knows which portion of memory to couple to arithmetic unit 18, the correct physical address of RAM 11 must be addressed by decoder 20. The physical address is chosen by decoder 20 as the seven most significant bits of the virtual address. Therefore, the physical address is 0000010 which is equivalent to two. By referring to FIG. 3, it can be readily verified that in RAM A at physical address two, virtual address "four" is stored. In this way decoder 20 functions to read virtual address "four" from memory. Also in cycle five, virtual address "two" is being written. As can be quickly seen from the physical location of virtual address "two" in RAM B, a bus conflict will not exist since the same memory portion is not being accessed for a read and write operation. Shortly after receiving the virtual address "four" and providing the proper decoded output, decoder 20 also receives in the same cycle virtual address "two" as an eight bit word 00000010. When the two least significant bits are exclusive ORed by gate 26, a logic one output results which causes RAM 12 (i.e. RAM B) to be selected by controller 16 to be written to. The actual physical address which is written in RAM 12 is also decoded by decoder 20 as being all bits of the eight bit virtual address except the least significant bit. Therefore, the physical address is "one". Referring to FIG. 3 it can be seen that virtual address "two" is located at physical address "one" as it is supposed to be. Therefore, the correct operand will be read to the correct memory location in RAM 12.

By using the serpentine virtual addressing in two separate memory portions, each of which may be communicated with via a separate bidirectional data bus, the reading and writing of data into memory in a processor during a single cycle may be accomplished. The present invention successfully uses serpentine configured addressing in connection with the specific decoding scheme taught in FIG. 2. By discarding the least significant of the bits of the virtual address bits, a correct physical address always exists. It should again be pointed out that two distinct RAM circuits are not required to implement the invention but rather only two distinct portions of a memory arranged in a manner as shown in FIG. 3.

By now it should be apparent that an addressing technique in a memory is provided which allows read, modify and write operations during a single cycle of operation in a processor. The present invention makes use of a pipelined processor architecture which permits multiple machine functions to occur in the same processor cycle. Although the present invention has been presented in the context of a processor being used in a filtering application, it should be apparent that the technique taught herein is applicable to any processing which utilizes a read, modify and write operation of a memory or storage device. Further, the present invention is not restricted to only RAM type memory devices but may be implemented with other types of memory.

While an embodiment has been disclosed using certain assumed parameters, it should be understood that certain obvious modifications to the circuit or the given parameters will become apparent to those skilled in the art, and the scope of the invention should be limited only by the scope of the claims appended hereto.

We claim:

1. In a processor with an arithmetic unit having cycles defined as an amount of time between successive receipt of input operands by the arithmetic unit, a method of addressing a memory to provide read and write operations with the memory in a single cycle, comprising the steps of:

partitioning the memory into first and second portions, and respectively coupling first and second bidirectional data buses to the first and second portions, each of said memory portions having a predetermined integer number of integer rank ordered physical and virtual address locations;

assigning the physical address locations of each memory portion in a sequential order;

assigning the rank ordered virtual address locations of the memory between the two portions wherein after assigning a lowest ranked virtual address location to designate the lowest ranked physical address location of the first memory portion, the virtual address locations are assigned between the first and second memory portions alternatingly by successive rank ordered pairs to successive physical address locations of each memory portion by alternating successive pairs between the first and second memory portions beginning with the second memory portion; and selectively addressing two successive add integer ranked or two successive even integer ranked virtual addresses for the purpose of writing to one of the two successive even or odd integer ranked virtual addresses and reading the other virtual address in the single cycle.

2. In a processor which reads operands from a modifies the operands with an arithmetic unit and writes modified operands to the memory, a circuit for performing read and write operations with the memory in a single cycle of the processor where a cycle is an amount of time between successive receipts of input operands of the arithmetic unit, comprising:

a memory partitioned into first and second portions, said first portion coupled to a first bidirectional data bus and said second portion coupled to a second bidirectional data bus, said memory having rank ordered virtual address locations where the operands and modified operands are stored, said virtual address locations assigned in a predetermined configuration between the two portions wherein a lowest rank ordered virtual address location is assigned to a lowest ranked physical address location of the first memory portion and remaining virtual address locations are assigned between the two memory portions alternatingly by successively ranked pairs to successive ranked physical address locations of each memory portion by alternating successive pairs between the first and second memory portions beginning with the second memory portion;

control means having first and second inputs respectively coupled to the memory via the first and second bidirectional data buses and having a third input and an output, for selectively communicating operands of both memory portions in response to a select signal;

an arithmetic unit having an input coupled to the output of the control means for selectively receiving operands form the memory, performing an arithmetic operation with each of the received operands, and having an output coupled to the third input of the control means for communicating a modified operand back to the memory to be read in the same cycle; and decoding means coupled to the memory and control means, for receiving and using predetermined virtual addresses to both provide physical address locations identifying where said virtual addresses are located in the memory and to provide the select signal to the control means.

3. The processor of claim 2 wherein the decoding means comprise logic means for using a portion of the received virtual addresses to provide the select signal.

4. The processor of claim 2 wherein the decoding means further comprises an exclusive OR gate for providing the select signal.

5. A circuit for performing read and write operations with a memory, comprising:

first and second memory portions, each of said memory portions having rank ordered virtual address locations assigned in a predetermined configuration between the first and second memory portions wherein a lowest rank ordered virtual address location is assigned a lowest ranked physical address location of the first memory portion and remaining virtual address locations are assigned between the first and second memory portions alternatingly by successively ranked pairs to successive ranked physical address locations of each memory portion by alternating successive pairs between the first and second memory portions beginning with the second memory portion;

first and second bidirectional data buses coupled to the first and second memory portions, respectively;

control means having first and second inputs respectively coupled to the first and second memory portions via the first and second bidirectional data buses, and having an output, said control means controlling the communicating operands to or from each of the first and second memory portions in response to a select signal;

an arithmetic unit having an input coupled to the output of the control means for selectively receiving a first operand from the first memory portion and performing an arithmetic operation with the received first operand in a single arithmetic unit cycle, and having an output coupled to a third input of the control means for outputting an output operand back to the second memory portion for storage before the single arithmetic unit cycle has terminated; and decoding means coupled to the memory portion and the control means, said decoding means receiving predetermined virtual addresses, and providing the select signal to the control means and addressing a first virtual address for being read from the first memory portion and addressing a second virtual address from the second memory portion for being written to in the single cycle.

* * * * *

UNITED STATES PATENT AND TRADEMARK OFFICE
CERTIFICATE OF CORRECTION

PATENT NO. : 5,001,665

DATED : March 19, 1991

INVENTOR(S) : Gergen et al.

It is certified that error appears in the above-identified patent and that said Letters Patent is hereby corrected as shown below:

In column 6, claim one, line 3, change "add" to --odd--;

Signed and Sealed this

Twentieth Day of October, 1992

*Attest:*

DOUGLAS B. COMER

*Attesting Officer*     *Acting Commissioner of Patents and Trademarks*